United States Patent
Lin et al.

(10) Patent No.: US 7,633,582 B2
(45) Date of Patent: Dec. 15, 2009

(54) OPTICAL COMPENSATOR FOR LIQUID CRYSTAL DISPLAY

(75) Inventors: Tsung-Hsien Lin, Tainan County (TW); Ming-Feng Hsieh, Tainan County (TW)

(73) Assignee: CHI MEI Optoelectronics Corp., Tainan (TW)

( * ) Notice: Subject to any disclaimer, the term of this patent is extended or adjusted under 35 U.S.C. 154(b) by 638 days.

(21) Appl. No.: 11/061,885

(22) Filed: Feb. 18, 2005

(65) Prior Publication Data

US 2005/0190327 A1    Sep. 1, 2005

(30) Foreign Application Priority Data

Feb. 27, 2004    (TW) .............................. 93105055 A

(51) Int. Cl.
*G02F 1/1335* (2006.01)
(52) U.S. Cl. ...................................... 349/117; 349/119
(58) Field of Classification Search ................ 349/118, 349/119, 117
See application file for complete search history.

(56) References Cited

U.S. PATENT DOCUMENTS

| | | | | |
|---|---|---|---|---|
| 6,671,017 | B2* | 12/2003 | Lyu et al. ...................... | 349/118 |
| 2003/0067572 | A1* | 4/2003 | Umeda et al. .................. | 349/117 |
| 2003/0179326 | A1* | 9/2003 | Kawata ........................ | 349/58 |
| 2003/0193636 | A1* | 10/2003 | Allen et al. ................... | 349/117 |
| 2004/0239852 | A1* | 12/2004 | Ono et al. ..................... | 349/118 |
| 2006/0119766 | A1* | 6/2006 | Mi et al. ....................... | 349/96 |

* cited by examiner

*Primary Examiner*—David Nelms
*Assistant Examiner*—Nathanael R Briggs
(74) *Attorney, Agent, or Firm*—Thomas, Kayden, Horstemeyer & Risley

(57) ABSTRACT

Embodiments of an optical compensator for a liquid crystal display is disclosed. One embodiment of the optical compensator includes an A-plate and a C-plate wherein:

the retardation of the A-plate satisfies the following formula:

$$0.644 < R0(450)/R0(550) < 1$$

the retardation of the C-plate satisfies the following formula:

$$1 < Rth(450)/Rth(550) < 1.35$$

where R0(450) and R0(550) represent the retardation of the A-plate at wavelengths of 450 nm and 550 nm, respectively, and Rth(450) and Rth(550) are the values calculated by $Rth = [[n_x + n_y]/2 - n_z] \times d$ (where $n_x$, $n_y$, and $n_z$ represent the three-dimensional refractive indexes of the C-plate as the refractive indexes in the direction of the x-axis, y-axis and z-axis, respectively, and d represents the thickness of the C-plate) for the C-plate at a wavelength of 450 nm and 550 nm, respectively. Other embodiments are also included.

6 Claims, 9 Drawing Sheets
(9 of 9 Drawing Sheet(s) Filed in Color)

| 30 |
|---|
| 120 |
| 150 |
| 100 |
| 150 |
| 110 |

OPTICAL COMPENSATOR FOR LIQUID CRYSTAL DISPLAY

BACKGROUND

1. Field of the Disclosure

The present disclosure relates to an optical compensator for enhancing the viewing angle of a liquid crystal display.

2. Description of the Related Art

Recently, various liquid crystal display (LCD) modes and compensation films have been proposed to enhance the viewing angle of LCDs. Vertically-aligned (VA) LCD is a typical example of LCDs with wide viewing angle. Vertically-aligned (VA) LCD is a mode using a negative liquid crystal material and vertical alignment film. When no voltage is applied, liquid crystal molecules are aligned in a vertical direction and black display appears. When a predetermined voltage is applied, the liquid crystal molecules are aligned in a horizontal direction and white display appears. Comparing to the twisted nematic (TN) LCD, the vertically-aligned (VA) LCD provides higher contrast, higher response speed, and excellent viewing angle characteristics. However, the VA LCD still has problems of color shift or narrow viewing angle due to a dark-state light leakage at large viewing angles which reduces the contrast. Typically, these problems can be reduced by introducing compensation films.

However, the performance of conventional compensation films are not acceptable since all of them are optimized for a single wavelength of light while not considering other wavelengths of the electromagnetic spectrum which are visible by human eyes.

SUMMARY

It is therefore an object of embodiments of the present disclosure to provide an optical compensator for a liquid crystal display, which overcomes, or at least reduces the above-mentioned problems of the prior art.

A liquid crystal display suitable for use with embodiments of the present disclosure generally includes an LCD cell and two polarizers respectively provided on outer surfaces of the LCD cell. Usually, the polarizer is made by a PVA (Poly-vinyl Alcohol) layer laminated between two protective layers, e.g., triacetate cellulose (TAC) films. The TAC film may also be replaced by other kinds of compensation films.

To achieve the above listed and other objects, one embodiment, among others, of the present disclosure provides an optical compensator including an A-plate and a C-plate, which respectively acts as the protective film of each inner side of the polarizer. An A-plate optimized for blue light (450 nm) has in-plane retardation $R0=(n_x-n_y) \times d$ at wavelengths of 450 nm and 550 nm satisfying the following formula (1):

$$0.644 < R0(450)/R0(550) < 1 \quad (1)$$

Moreover, a C-plate optimized for blue light (450 nm) has retardation satisfying the following formula (2):

$$1 < Rth(450)/Rth(550) < 1.35 \quad (2)$$

Rth(450) and Rth(550) are the values calculated by $Rth=[[n_x+n_y]/2-n_z]\times d$ (where $n_x$, $n_y$ and $n_z$ represent the three-dimensional refractive indexes of the C-plate as the refractive indexes in the direction of the x-axis, y-axis and z-axis, respectively, and d represents the thickness of the C-plate) for the C-plate at wavelengths of 450 nm and 550 nm, respectively.

An A-plate optimized for red light (650 nm) has in-plane retardation at wavelengths of 650 nm and 550 nm satisfying the following formula (3):

$$1 < R0(650)/R0(550) < 1.36 \quad (3)$$

Moreover, a C-plate optimized for red light (650 nm) has retardation satisfying the following formula (4):

$$0.874 < Rth(650)/Rth(550) < 1 \quad (4)$$

Rth(650) and Rth(550) represent Rth values for the C-plate at wavelengths of 650 nm and 550 nm, respectively.

It should be understood that, when the optimization is performed for both blue light (450 nm) and red light (650 nm), the in-plane retardation of an optimized A-plate at wavelengths of 450 nm, 550 nm and 650 nm should satisfy the formulae (1) and (3), and Rth values for an optimized C-plate at wavelengths of 450 nm, 550 nm and 650 nm should satisfy the formulae (2) and (4).

To achieve the above listed and other objects, one embodiment, among others, of the present disclosure further provides another optical compensator including two biaxial plates, which respectively acts as the protective film of each inner side of the polarizer. A biaxial plate optimized for blue light (450 nm) has retardation satisfying the following formulae (5) and (6):

$$82.38 < R0(450) + 0.41 \times Rth(450) < 107.35 \quad (5)$$

$$-910.5 < R0(450) - 5.5 \times Rth(450) < -690.5 \quad (6)$$

R0(450) represents the in-plane retardation of the biaxial plate at a wavelength of 450 nm, and Rth(450) is the value calculated by $Rth=[[n_x+n_y]/2-n_z]\times d$ (where $n_x$, $n_y$ and $n_z$ represent the three-dimensional refractive indexes of the biaxial plate as the refractive indexes in the direction of the x-axis, y-axis and z-axis, respectively, and d represents the thickness of the biaxial plate) for the biaxial plate at a wavelengths of 450 nm.

When the optimization is performed for red light (650 nm), the retardation of an optimized biaxial plate satisfies the following formulae (7) and (8):

$$180.872 < R0(650) + 0.975 \times Rth(650) < 206.681 \quad (7)$$

$$-295.241 < R0(650) - 2.51 \times Rth(650) < -206.537 \quad (8)$$

R0(650) represents the in-plane retardation of the biaxial plate at a wavelength of 650 nm, and Rth(650) is the Rth value for the biaxial plate at a wavelengths of 650 nm.

It should be understood that, when the optimization is performed for both blue light (450 nm) and red light (650 nm), the retardation of the optimized biaxial plate at wavelengths of 450 nm, 550 nm and 650 nm should satisfy the formulae (5) to (8).

In one embodiment of a liquid crystal display for use with the present disclosure, the polarizer may further include a protective layer, e.g., a triacetate cellulose (TAC) film. Since the triacetate cellulose film also has phase retardation effect, their contribution to compensation should be taken into consideration.

When an LCD having one more 80 μm thick triacetate cellulose film additive on one inner side of the protective TAC film and a single biaxial plate additive on the other polarizer's inner side, is optimized for blue light (450 nm), the in-plane retardation of an optimized biaxial plate at a wavelength of 450 nm satisfies the following formulae (9) and (10):

$$-1914 < R0(450) - 7.56 \times Rth(450) < -1311.7 \quad (9)$$

$$51.17 < R0(450) + 0.12 \times Rth(450) < 93.07 \quad (10)$$

When optimized for red light (650 nm), a biaxial plate having retardation satisfying the following formulae (11) and (12) provides preferred compensation.

$$157.5 < R0(650) + 0.576 \times Rth(650) < 200.7 \quad (11)$$

$$-143.988 < R0(650) - 1.34 \times Rth(650) < -68.14 \quad (12)$$

It should be understood that, when the optimization is performed for both blue light (450 nm) and red light (650 nm), the retardation of an optimized biaxial plate at wavelengths of 450 nm, 550 nm and 650 nm should satisfy the formulae (9) to (12).

When an LCD, having one more 80 µm thick TAC film on one inner side of the protective TAC film and adopting a single-sided compensation structure using an A-plate plus a C-plate laminated together on the other side, is optimized for blue light (450 nm), the in-plane retardation of an optimized A-plate at wavelengths of 450 nm and 550 nm satisfies the following formula (13):

$$0.5 < R0(450)/R0(550) < 1.198 \quad (13)$$

Moreover, the retardation of the C-plate satisfies the following formula (14):

$$1.125 < Rth(450)/Rth(550) < 1.583 \quad (14)$$

When the optimization is performed for red light (650 nm), the in-plane retardation of an optimized A-plate at wavelengths of 650 nm and 550 nm satisfies the following formula (15):

$$1.03 < R0(650)/R0(550) < 1.468 \quad (15)$$

Moreover, the retardation of the C-plate satisfies the following formula (16):

$$0.72 < Rth(650)/Rth(550) < 0.995 \quad (16)$$

It should be understood that, when the optimization is performed for both blue light (450 nm) and red light (650 nm), the in-plane retardation of an optimized A-plate at wavelengths of 450 nm, 550 nm and 650 nm should satisfy the formulae (13) and (15), and Rth values for an optimized C-plate at wavelengths of 450 nm, 550 nm and 650 nm should satisfy the formulae (14) and (16).

The optical compensators provided in one embodiment of the present disclosures (A plate/C-plate and biaxial plate) are optimized for lights of three primary colors (450 nm, 550 nm, 650 nm) such that the dark-state light leakage is reduced at most viewing angles which results in a better contrast.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

These and other features, aspects, and advantages of the present disclosure will be more fully understood by reading the following detailed description of the embodiments, with reference made to the accompanying drawings as follows.

DETAILED DESCRIPTION

Figure 1:
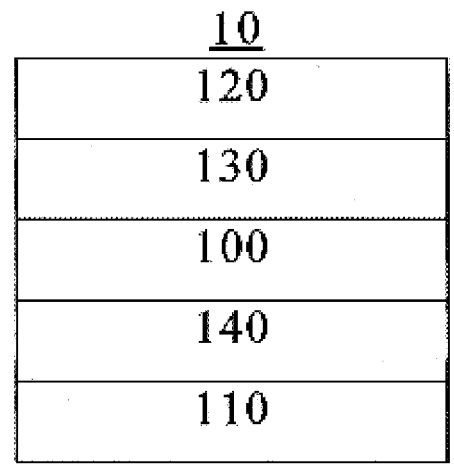
FIG. 1 is a cross sectional view of a liquid crystal display according to one embodiment of the present disclosure.

FIG. 1 shows a liquid crystal display 10 according to one embodiment of the present disclosure. The liquid crystal display 10 mainly includes a vertically-aligned (VA) LCD cell 100 positioned between two polarizers 110 and 120 which are arranged to be crossed such that their absorbing axes are orthogonal to each other.

An A-plate and a C-plate are respectively inserted between the polarizers 110 and 120 and the liquid crystal display cell 100 to reduce dark-state light leakage and increase the contrast, wherein the optic axis of the A-plate is arranged at an angle of 90 degrees to the absorbing axis of the polarizer located on the same side. In this embodiment, since the polarizer only consists of an absorbing layer, the liquid crystal display 10 is not provided with any other compensation plate except the A-plate 130 and the C-plate 140. Conventional A-plates and C-plates are typically optimized only for green light (550 nm) because human eyes are most sensitive to green light.

In some embodiments, simulation programs (LCDBench Ver 5.3 and Mathematica Ver 6.0) are used to calculate the optical parameters of a conventional A-plate (e.g., a 73.5 µm thick film of norbornene resin (Arton made by JSR, Co., Ltd.) and a C-plate (e.g., a 6.73 µm thick film of PLC (polymer liquid crystal)). The result is shown in Table 1.

This simulation is performed on a structure of the liquid crystal display 10 shown in FIG. 1 in which each pixel region of the LCD cell 100 is divided into four domains ($\alpha=89°$; $\phi=45°$, 135°, 225°, 31°, $\alpha$ represents the liquid crystal's tilt angle from the surface of LCD, $\phi$ represents the azimuth angle in four domains). The LCD cell 100 is a multi-domain vertically aligned (MVA) LCD. Although each pixel region of the MVA LCD is typically divided into four (or other number) domains and the average tilt angle of each domain in the dark state may not be 90°, the best contrast compensation (minimum light leakage) for 4-domains summarized in a dark state at large viewing angles is optimized by just setting α=90' for all domains, i.e. the same as a single domain. The phase retardation of the LCD cell 100 is the product of birefringence (ne-no) and the overall thickness of the liquid crystal layer, where ne and no respectively represent the extraordinary refractive index and the ordinary refractive index. In some embodiments, the polarizers 110 and 120 are implemented using SQ852 polarizers, which are commercially available from Sumitomo Chemical Co., Ltd. (e.g., the absorbing axis of the polarizer 110 is 90°, the absorbing axis of the polarizer 120 is 0°, and the thickness of the absorbing layer PVA is 20 µm).

TABLE 1

| Conventional C-plate | Rth(λ)/Rth(550) |
|---|---|
| 450 nm | 1 |
| 550 nm | 1 |
| 650 nm | 1 |
| Conventional A-plate | R0(λ)/R0(550) |
| 450 nm | 1 |
| 550 nm | 1 |
| 650 nm | 1 |

R0(λ) represents the in-plane retardation ($[n_x-n_y] \times d$) of the A-plate at wavelength λ, and Rth(λ) is the value calculated by Rth=$[[n_x+n_y]/2-n_z] \times d$ (where $n_x$, $n_y$ and $n_z$ represent the three-dimensional refractive indexes of the C-plate as the refractive indexes in the direction of the x-axis, y-axis and z-axis, respectively, and d represents the thickness of the C-plate) for the C-plate at wavelength λ.

Thereafter, the optical parameters of optimized C-plate (6.73 µm thick) and A-plate (73.5 µm thick) are determined by a Poincare sphere method. The result is shown in Table 2 wherein R0(λ) and Rth(λ) are defined the same as above.

TABLE 2

| Optimized C-Plate | Rth(λ)/Rth(550) |
|---|---|
| 450 | 1.161470588 |
| 550 | 1 |
| 650 | 0.924382353 |
| Optimized A-plate | R0(λ)/R0(550) |
| 450 nm | 0.822368421 |
| 550 nm | 1 |
| 650 nm | 1.187894737 |

Figure 2:
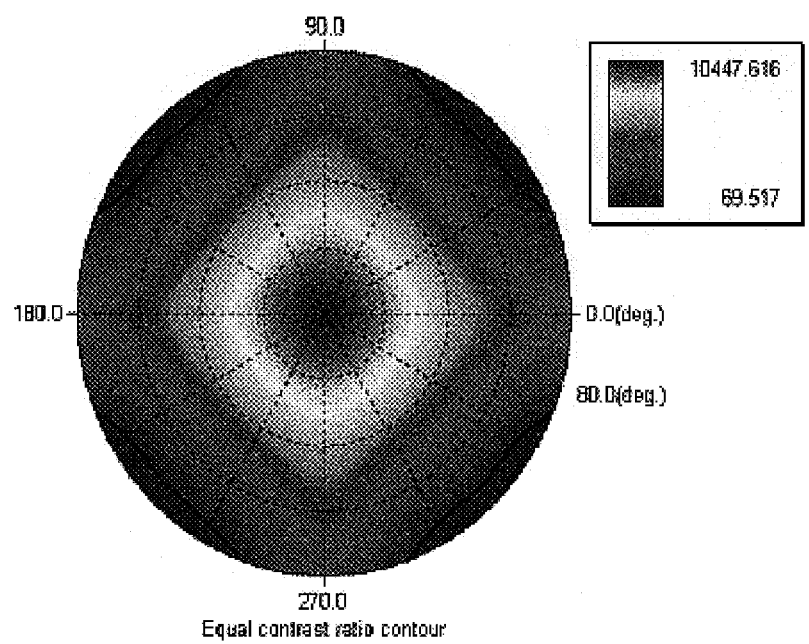
FIG. 2 is an iso-contrast contour for an LCD having the structure of FIG. 1 using conventional A-plate and C-plate.
Figure 3:
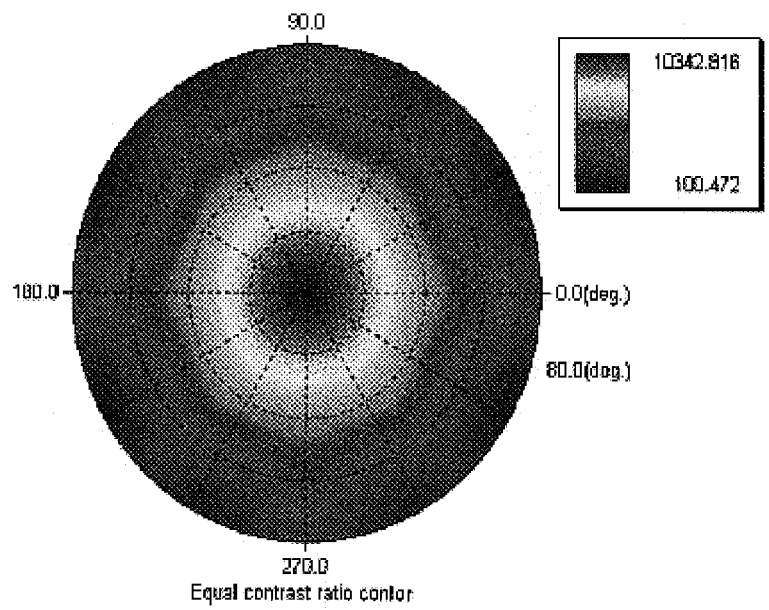
FIG. 3 is an iso-contrast contour for an LCD having the structure of FIG. 1 using optimized A-plate and C-plate of the present disclosure.

FIG. 2 shows an iso-contrast contour for an LCD having the structure of FIG. 1 using the conventional A-plate and C-plate described above. FIG. 3 shows an iso-contrast contour for an LCD having the structure of FIG. 1 using the optimized A-plate and C-plate described above. The concentric circles correspond to different polar angles Ε), while the lines (at 0, 90, 180, 270 degrees) indicate azimuthal angles φ. Since the conventional A-plate and C-plate are typically optimized only for green light (550 nm), a significant light leakage is found at large polar angles Θ (e.g., 60 degrees) viewed from an azimuthal angle 4) of 45 degrees which reduces the contrast to only 221.019. Furthermore, as shown in FIG. 2, it can be seen that on any concentric circle (for example, the circle of 60 degrees), the amount of light leakage of the conventional device in the diagonal direction is much larger than in the horizontal (the line 0-180 degree) or vertical (the line 90-270 degree) direction. By contrast, the optimized A-plate and C-plate described above can significantly reduce the light leakage at a polar angle Θ of 60 degrees viewed from an azimuthal angle φ of 45 degrees thereby significantly increasing the contrast to 509.273. Furthermore, as shown in FIG. 3, it can be seen that on any concentric circle (for example, the circle of 60 degrees), the amount of light leakage of the LCD using the optimized A-plate and C-plate in the diagonal direction is substantially identical in all directions.

When an LCD having the structure of FIG. 1 is optimized for blue light (450 nm), the in-plane retardation of an optimized A-plate at wavelengths of 450 nm and 550 nm satisfies the following formula (1):

$$0.644 < R0(450)/R0(550) < 1 \quad (1)$$

Moreover, the retardation of an optimized C-plate satisfies the following formula (2):

$$1 < Rth(450)/Rth(550) < 1.35 \quad (2)$$

Rth(450) and Rth(550) are the values calculated by Rth=$[[n_x+n_y]/2-n_z] \times d$ (where $n_x$, $n_y$ and $n_z$ represent the three-dimensional refractive indexes of the C-plate as the refractive indexes in the direction of the x-axis, y-axis and z-axis, respectively, and d represents the thickness of the C-plate) for the C-plate at wavelengths of 450 nm and 550 nm, respectively.

When an LCD having the structure of FIG. 1 is optimized for red light (650 nm), the in-plane retardation of an optimized A-plate at wavelengths of 650 nm and 550 nm satisfies the following formula (3):

$$1 < R0(650)/R0(550) < 1.36 \quad (3)$$

Moreover, the retardation of an optimized C-plate satisfies the following formula (4):

$$0.874 < Rth(650)/Rth(550) < 1 \quad (4)$$

Rth(650) and Rth(550) represent Rth values for the C-plate at wavelengths of 650 nm and 550 nm, respectively.

It should be understood that, when the optimization is performed for both blue light (450 nm) and red light (650 nm), the in-plane retardation of an optimized A-plate at wavelengths of 450 nm, 550 nm and 650 nm should satisfy the formulae (1) and (3), and Rth values for an optimized C-plate at wavelengths of 450 nm, 550 nm and 650 nm should satisfy the formulae (2) and (4).

Figure 4:
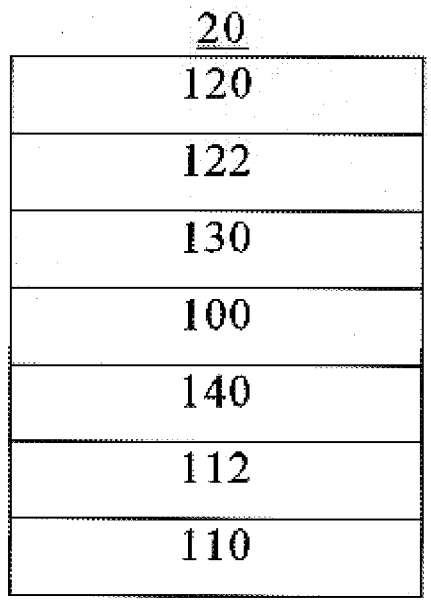
FIG. 4 is a cross sectional view of a liquid crystal display according to another embodiment of the present disclosure.

FIG. 4 shows a liquid crystal display 20 according to another embodiment of the present disclosure. The liquid crystal display 20 is substantially identical to the liquid crystal display 10 of FIG. 1 with the exception that each of the polarizers 110 and 120 further includes a protective layer, e.g., triacetate cellulose films 112 and 122, which are positioned adjacent to the A-plate 130 and the C-plate 140, respectively. Specifically, the triacetate cellulose film 112 is positioned between the C-plate 140 and the polarizer 110, and the triacetate cellulose film 122 is positioned between the A-plate 120 and the polarizer 130. Since the triacetate cellulose films 112 and 122, which may be regarded as one kind of C-plate, also have phase retardation effect, their contribution to compensation should be taken into consideration.

In this embodiment, if the triacetate cellulose film has a thickness of 80 μm, the optical parameters of optimized C-plate (4.93 μm thick) and A-plate (51.9 μm thick) are determined by a Poincare sphere method as shown in Table 3.

TABLE 3

| Optimized C-Plate | $Rth(\lambda)/Rth(550)$ |
|---|---|
| 450 nm | 1.291764706 |
| 550 nm | 1 |
| 650 nm | 0.860882353 |
| Optimized A-plate | $R0(\lambda)/R0(550)$ |
| 450 nm | 0.842105263 |
| 550 nm | 1 |
| 650 nm | 1.205263158 |

As is clear from Table 3, when optimized for blue light (450 nm), an A-plate having a retardation ratio R0(450)/R0(550) of 0.842 and a C-plate having a retardation ratio Rth(450)/Rth(550) of 1.292 provide superior compensation for the liquid crystal display 20 having 80 μm triacetate cellulose films. When optimized for red light (650 nm), an A-plate having a retardation ratio R0(650)/R0(550) of 1.205 and a C-plate having a retardation ratio Rth(650)/Rth(550) of 0.861 provide superior compensation for the liquid crystal display 20 having 80 μm thick triacetate cellulose films.

Figure 5:
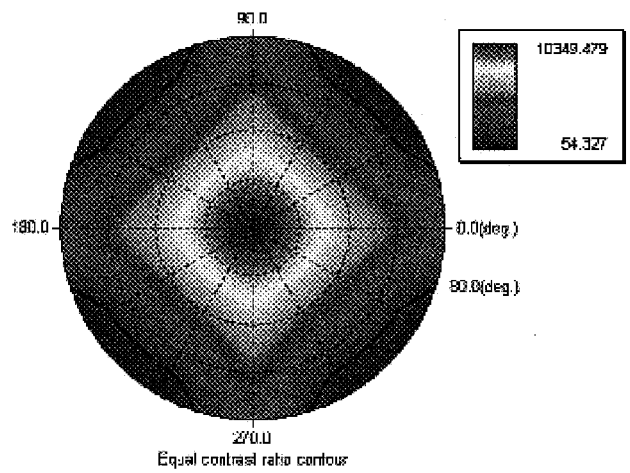
FIG. 5 is an iso-contrast contour for an LCD (having the structure of FIG. 4 and 80 µm triacetate cellulose films) using conventional A-plate and C-plate.
Figure 6:
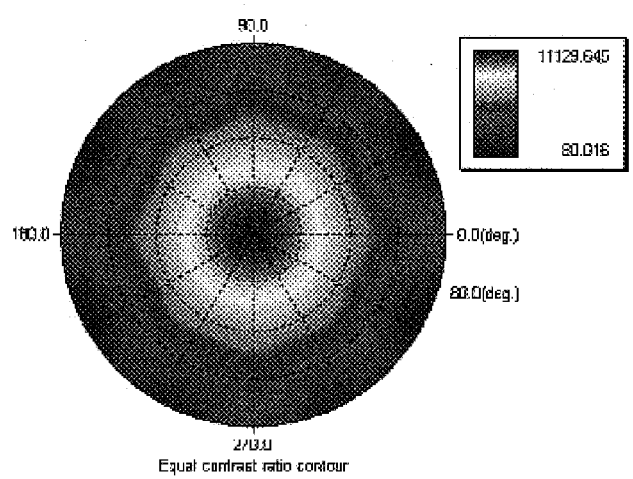
FIG. 6 is an iso-contrast contour for an LCD (having the structure of FIG. 4 and 80 µm triacetate cellulose films) using optimized A-plate and C-plate of the present disclosure.

FIG. 5 shows an iso-contrast contour for an LCD (having the structure of FIG. 4 and 80 μm triacetate cellulose films) using the conventional A-plate and C-plate described above. FIG. 6 shows an iso-contrast contour for an LCD (having the structure of FIG. 4 and 80 μm triacetate cellulose films) using the optimized A-plate and C-plate described in the last paragraph. As shown in FIG. 5 and FIG. 6, it can be seen that the LCD using the conventional A-plate and C-plate has a contrast of only 179.704, while the LCD using the optimized A-plate and C-plate has a contrast of 510.911 when viewed at a polar angle Θ of 60 degrees and at an azimuthal angle φ of 45 degrees.

In this embodiment, if the triacetate cellulose film has a thickness of 40 μm, the optical parameters of optimized C-plate (4.93 μm thick) and A-plate (51.9 μm thick) are determined by a Poincare sphere method as shown in Table 4.

TABLE 4

| Optimized C-Plate | $Rth(\lambda)/Rth(550)$ |
|---|---|
| 450 nm | 1.210294118 |
| 550 nm | 1 |
| 650 nm | 0.899411765 |
| Optimized A-plate | $R0(\lambda)/R0(550)$ |
| 450 nm | 0.826315789 |
| 550 nm | 1 |
| 650 nm | 1.194736842 |

As is clear from Table 4, when optimized for blue light (450 nm), an A-plate having a retardation ratio R0(450)/R0(550) of 0.826 and a C-plate having a retardation ratio Rth(450)/Rth(550) of 1.21 provide superior compensation for the liquid crystal display 20 having 40 μm triacetate cellulose films. When optimized for red light (650 nm), an A-plate having a retardation ratio R0(650)/R0(550) of 1.195 and a C-plate having a retardation ratio Rth(650)/Rth(550) of 0.9 provide superior compensation for the liquid crystal display 20 having 40 μm thick triacetate cellulose films.

Figure 7:
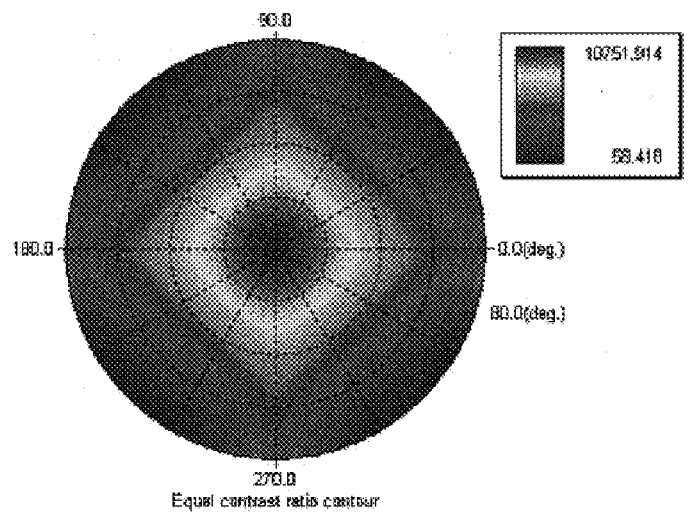
FIG. 7 is an iso-contrast contour for an LCD (having the structure of FIG. 4 and 40 µm triacetate cellulose films) using conventional A-plate and C-plate.
Figure 8:
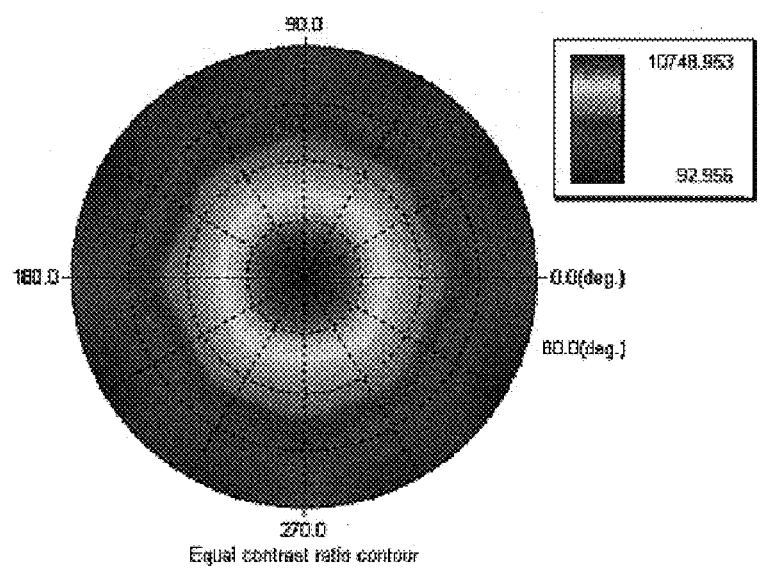
FIG. 8 is an iso-contrast contour for an LCD (having the structure of FIG. 4 and 40 µm triacetate cellulose films) using optimized A-plate and C-plate of the present disclosure.

FIG. 7 shows an iso-contrast contour for an LCD (having the structure of FIG. 4 and 40 μm triacetate cellulose films) using the conventional A-plate and C-plate described above. FIG. 8 shows an iso-contrast contour for an LCD (having the structure of FIG. 4 and 40 μm triacetate cellulose films) using the optimized A-plate and C-plate described in the last paragraph. As shown in FIG. 7 and FIG. 8, it can be seen that the LCD using the conventional A-plate and C-plate has a contrast of only 189.11, while the LCD using the optimized A-plate and C-plate has a contrast of 505.228 when viewed at a polar angle Θ of 60 degrees and at an azimuthal angle φ of 45 degrees.

Figures 9, 10:
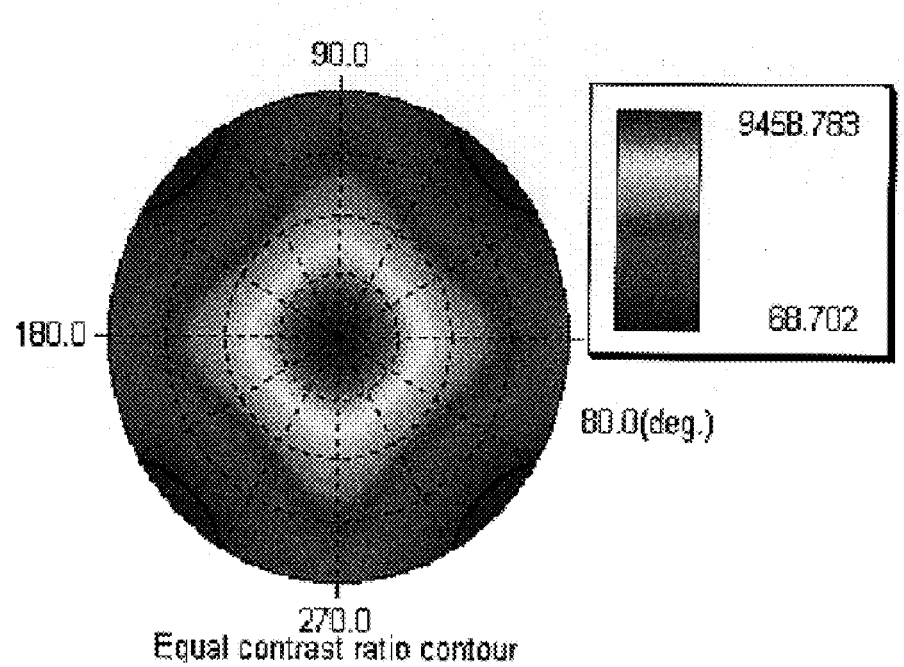
FIG. 9 is a cross sectional view of a liquid crystal display according to another embodiment of the present disclosure.
FIG. 10 is an iso-contrast contour for an LCD having the structure of FIG. 9 using two conventional biaxial plates.

FIG. 9 shows a liquid crystal display 30 according to another embodiment of the present disclosure. The liquid crystal display 30 is substantially identical to the liquid crystal display 10 of FIG. 1 with the exception that two biaxial plates 150 are respectively provided between the polarizers 110 and 120 and the liquid crystal display cell 100. In this embodiment, the biaxial plate 150 acts as a protective layer as well as a compensation plate. Conventional biaxial plates are typically optimized only for green light because human eyes are most sensitive to green light.

In some embodiments, simulation programs (LCDBench Ver 5.3 and Mathematica Ver 6.0) are used to calculate the optical parameters of a biaxial plate (e.g., a 86.8 μm thick film formed by modifying and stretching a TAC substrate). The result is shown in Table 5. This simulation is performed on a structure of the liquid crystal display 30 shown in FIG. 9 in which each pixel region of the LCD cell 100 is divided into four domains (a=89°; φ=45°, 135°, 225°, 315°). In some embodiments, the polarizers 110 and 120 are implemented using SQ852 polarizers which are commercially available from Sumitomo Chemical Co., Ltd. (e.g., the absorbing axis of the polarizer 110 is 90°, the absorbing axis of the polarizer 120 is 0°, and the thickness of the absorbing layer PVA is 20 μm).

TABLE 5

| Conventional biaxial plate | $R0(\lambda)/R0(550)$ | $Rth(\lambda)/Rth(550)$ |
|---|---|---|
| 450 nm | 128.464 | 0.931034483 |
| 550 nm | 135.408 | 1 |
| 650 nm | 140.616 | 1 |

$R0(\lambda)$ represents the in-plane retardation ($[n_x-n_y] \times d$) of the biaxial plate at wavelength λ, and $Rth(\lambda)$ is the value calculated by $Rth=[[n_x+n_y]/2-n_z] \times d$ (where $n_x$, $n_y$ and $n_z$ represent the three-dimensional refractive indexes of the biaxial plate as the refractive indexes in the direction of the x-axis, y-axis and z-axis, respectively, and d represents the plate thickness) for the biaxial plate at wavelength λ.

Thereafter, we have determined the optical parameters of an optimized biaxial plate (86.8 μm thick) by a Poincare sphere method. The result is shown in Table 6 wherein $R0(\lambda)$ and $Rth(\lambda)$ are defined the same as above.

TABLE 6

| Optimized biaxial plate | $R0(\lambda)/R0(550)$ | $Rth(\lambda)/Rth(550)$ |
|---|---|---|
| 450 | 152.0302 | 0.656896552 |
| 550 | 135.408 | 1 |
| 650 | 128.3251 | 1.416551724 |

Figure 11:
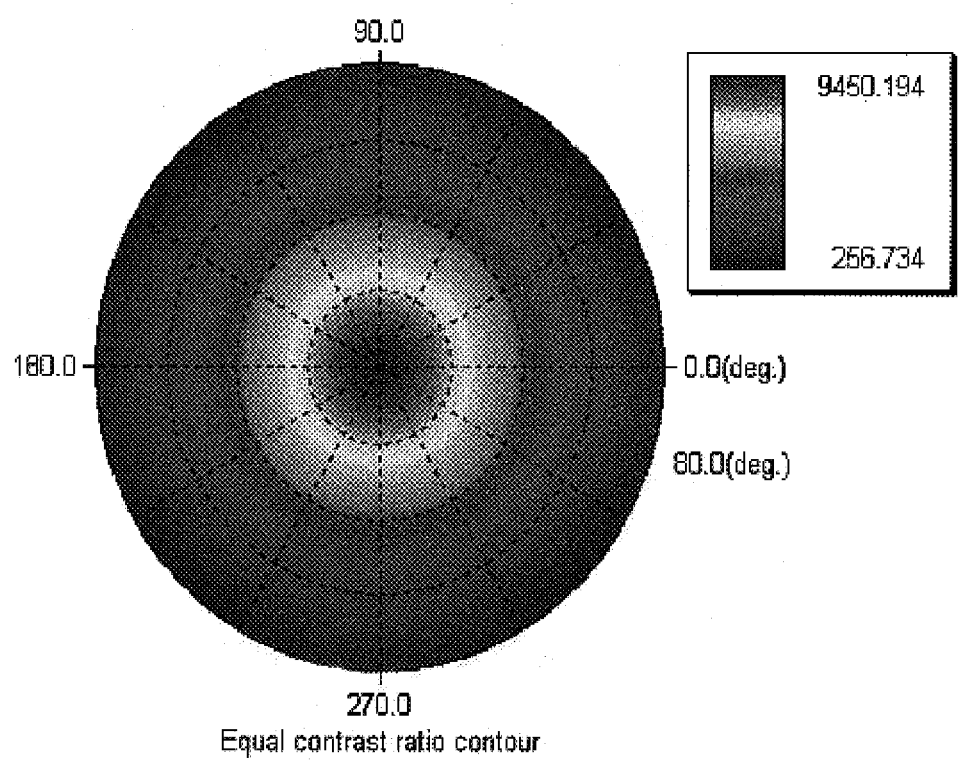
FIG. 11 is an iso-contrast contour for an LCD having the structure of FIG. 9 using two optimized biaxial plates of the present disclosure.

FIG. 10 shows an iso-contrast contour for an LCD having the structure of FIG. 9 using the conventional biaxial plate described above. FIG. 11 shows an iso-contrast contour for an LCD having the structure of FIG. 9 using the optimized biaxial plate described above. Since the conventional biaxial plate is typically optimized only for green light (550 nm), a significant light leakage is found at large polar angles Θ (e.g., 60 degrees) viewed from an azimuthal angle φ of 45 degrees which reduces the contrast to only 206.025. Furthermore, as shown in FIG. 10, it can be seen that on any concentric circle (for example, the circle of 60 degrees), the amount of light leakage of the conventional device in the diagonal direction is much larger than in the horizontal (the line 0-180 degree) vertical (the line 90-270 degree) direction. By contrast, the optimized biaxial plate described above can significantly reduce the light leakage at a polar angle Θ of 60 degrees viewed from an azimuthal angle φ of 45 degrees thereby contrast to 598.527.

The ranges of the optical parameters of a biaxial plate optimized for blue light (450 nm) have also been determined, as discussed below.

The retardation of the optimized biaxial plate satisfies the following formulae (5) and (6):

$$82.38 < R0(450)0.41 \times Rth(450) < 107.35 \quad (5)$$

$$-910.5 < R0(450) - 5.5 \times Rth(450) < -690.5 \quad (6)$$

R0(450) represents the in-plane retardation of the biaxial plate at a wavelength of 450 nm, and Rth(450) is the value calculated by Rth=[[$n_x+n_y$]/2−$n_z$]×d (where $n_x$, $n_y$ and $n_z$ represent the three-dimensional refractive indexes of the biaxial plate as the refractive indexes in the direction of the x-axis, y-axis and z-axis, respectively, and d represents the thickness of the biaxial plate) for the biaxial plate at a wavelengths of 450 nm.

When the optimization is performed for red light (650 nm), the retardation of an optimized biaxial plate satisfies the following formulae (7) and (8):

$$180.872 < R0(650) + 0.975 \times Rth(650) < 206.681 \quad (7)$$

$$-295.241 < R0(650) - 2.51 \times Rth(650) < -206.537 \quad (8)$$

R0(650) represents the in-plane retardation of the biaxial plate at a wavelength of 650 nm, and Rth(650) is the Rth value for the biaxial plate at a wavelengths of 650 nm.

It should be understood that, when the optimization is performed for both blue light (450 nm) and red light (650 nm), the retardation of the optimized biaxial plate at wavelengths of 450 nm, 550 nm and 650 nm should satisfy the formulae (5) to (8).

Figures 12, 13:
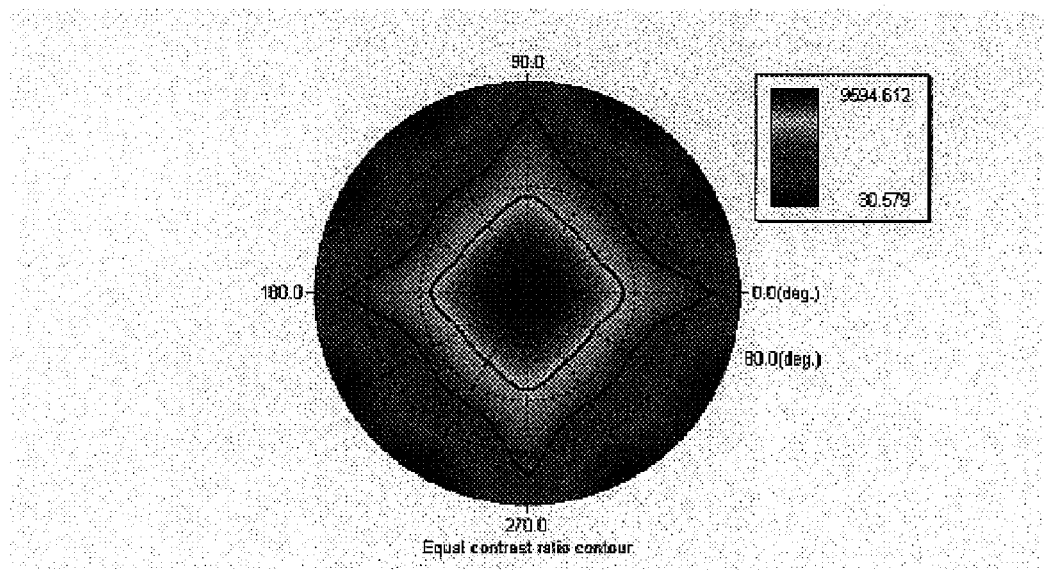
FIG. 12 is a cross sectional view of a liquid crystal display according to another embodiment of the present disclosure.
FIG. 13 is an iso-contrast contour for an LCD having the structure of FIG. 9 using a conventional biaxial plate.

FIG. 12 shows a liquid crystal display 40 according to another embodiment of the present disclosure. The liquid crystal display 40 is substantially identical to the liquid crystal display 30 of FIG. 9 with the exception that each of the polarizers 110 and 120 further includes a protective layer, e.g., triacetate cellulose films 112 and 122, and the biaxial plate 150 between the LCD cell 100 and the polarizer 120 is removed. Note that the liquid crystal display 40 adopts a single-sided compensation structure using a biaxial plate.

In some embodiments, simulation programs (LCDBench Ver 5.3 and Mathematica Ver 6.0) are used to calculate the optical parameters of a 100 μm thick conventional biaxial plate. The result is shown in Table 7. This simulation is performed on a structure of the liquid crystal display 40 shown in FIG. 12 in which each pixel region of the LCD cell 100 is divided into four domains (α=89°; φ=45°, 135°, 225°, 315°) In some embodiments, the polarizers 110 and 120 are implemented using SQ852 polarizers commercially available from Sumitomo Chemical Co., Ltd. (e.g., the absorbing axis of the polarizer 110 is 90°, the absorbing axis of the polarizer 120 is 0°, and the thickness of the absorbing layer PVA is 20 μm).

TABLE 7

| Conventional biaxial plate | R0(λ)/R0(550) | Rth(λ)Rth(550) |
|---|---|---|
| 450 nm | 173.3998422 | 0.993 |
| 550 nm | 167.1 | 1.000 |
| 650 nm | 164.5710 | 1.018 |

Thereafter, the optical parameters of an optimized biaxial plate (100 μm thick) are determined by a Poincare sphere method. The result is shown in Table 8 for R0(A) and Rth(A).

TABLE 8

| Optimized biaxial plate | R0(λ)/R0(550) | Rth(λ)/Rth(550) |
|---|---|---|
| 450 nm | 220.3 | 0.690 |
| 550 nm | 167.1 | 1.000 |
| 650 nm | 149.2 | 1.393 |

Figures 14, 15:
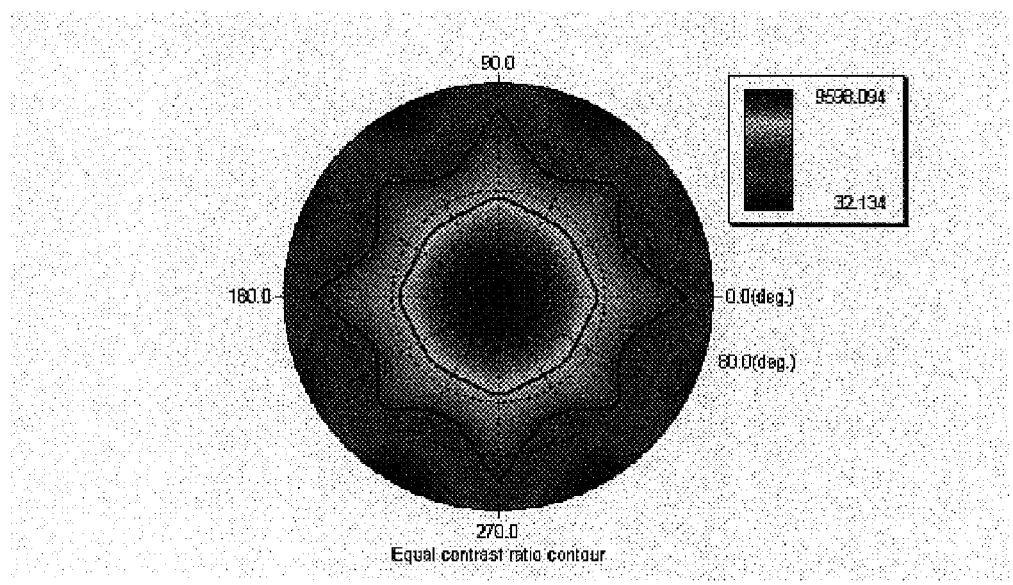
FIG. 14 is an iso-contrast contour for an LCD having the structure of FIG. 9 using an optimized biaxial plate of the present disclosure.
FIG. 15 is a cross sectional view of a liquid crystal display according to another embodiment of the present disclosure.

FIG. 13 shows an iso-contrast contour for an LCD having the structure of FIG. 12 using the conventional biaxial plate described above. FIG. 14 shows an iso-contrast contour for an LCD having the structure of FIG. 12 using the optimized biaxial plate described above. Since the conventional biaxial plate is typically optimized only for green light (550 nm), a significant light leakage is found at large polar angles Θ (e.g., 60 degrees) viewed from an azimuthal angle Θ of 45 degrees which reduces the contrast to only 184.082. By contrast, the optimized biaxial plate described above can significantly reduce the light leakage at a polar angle Θ of 60 degrees viewed from an azimuthal angle φ of 45 degrees thereby significantly increasing the contrast to 496.303.

When an LCD having the structure of FIG. 12 is optimized for blue light (450 nm), the in-plane retardation of an optimized biaxial plate at a wavelength of 450 nm satisfies the following formulae (9) and (10):

$$-1914 < R0(450) - 7.56 \times Rth(450) < -1311.7 \quad (9)$$

$$51.17 < R0(450) + 0.12 \times Rth(450) < 93.07 \quad (10)$$

When optimized for red light (650 nm), a biaxial plate having a retardation satisfying the following formulae (11) and (12) provide superior compensation.

$$157.5 < R0(650) + 0.576 \times Rth(650) < 200.7 \quad (11)$$

$$-143.988 < R0(650) - 1.34 \times Rth(650) < -68.14 \quad (12)$$

It should be understood that, when the optimization is performed for both blue light (450 nm) and red light (650 nm), the retardation of an optimized biaxial plate at wavelengths of 450 nm, 550 nm and 650 nm should satisfy the formulae (9) to (12).

FIG. 15 shows a liquid crystal display 50 according to another embodiment of the present disclosure. The liquid crystal display 50 is substantially identical to the liquid crystal display 20 of FIG. 4 with the exception that the A-plate is positioned between the LCD cell 100 and the C-plate 140. As shown, the polarizers 110 and 120 respectively include a 80 μm thick protective layer, e.g., triacetate cellulose films 112 and 122, which are positioned adjacent to the C-plate 140 and the LCD cell 100, respectively. Specifically, the triacetate cellulose film 112 is positioned between the C-plate 140 and the polarizer 110, and the triacetate cellulose film 122 is positioned between the polarizer 130 and the LCD cell 100. Note that although the A-plate 130 is illustrated to be positioned between the LCD cell 100 and the C-plate 140, the positions of the A-plate 130 and the C-plate 140 may be exchanged with each other such that the A-plate 130 is positioned between the C-plate 140 and the triacetate cellulose film 112. Note that the liquid crystal display 50 adopts a single-sided compensation structure using an A-plate and a C-plate.

In some embodiments, simulation programs (LCDBench Ver 5.3 and Mathematica Ver 6.0) are used to calculate the optical parameters of a conventional A-plate (e.g., a 80 μm thick film of norbornene resin (Arton made by JSR, Co., Ltd.) and a C-plate (e.g., a 6.73 μm thick film of PLC). The result is shown in Table 9. This simulation is performed on a structure of the liquid crystal display 50 shown in FIG. 15 in which each pixel region of the LCD cell 100 is divided into four domains ($\alpha=89°$; $\phi=45°, 135°, 225°, 315°$). In some embodiments, the polarizers 110 and 120 are SQ852 polarizers commercially available from Sumitomo Chemical Co., Ltd. (where the absorbing axis of the polarizer 110 is 90°, the absorbing axis of the polarizer 120 is 0°, and the thickness of the absorbing layer PVA is 20 μm).

TABLE 9

| Conventional C-plate | $Rth(\lambda)/Rth(550)$ |
|---|---|
| 450 nm | 0.99985 |
| 550 nm | 1.00000 |
| 650 nm | 1.00008 |

| Conventional A-plate | $R0(\lambda)/R0(550)$ |
|---|---|
| 450 nm | 0.999 |
| 550 nm | 1.000 |
| 650 nm | 1.008 |

Thereafter, the optical parameters of optimize d C-plate and A-plate are determined by a Poincare sphere method. The result is shown in Table 10.

TABLE 10

| Optimized C-Plate | $Rth(\lambda)/Rth(550)$ |
|---|---|
| 450 nm | 1.304 |
| 550 nm | 1.000 |
| 650 nm | 0.847 |

| Optimized A-plate | $R0(\lambda)/R0(550)$ |
|---|---|
| 450 nm | 0.842 |
| 550 nm | 1.000 |
| 650 nm | 1.242 |

Figure 16:
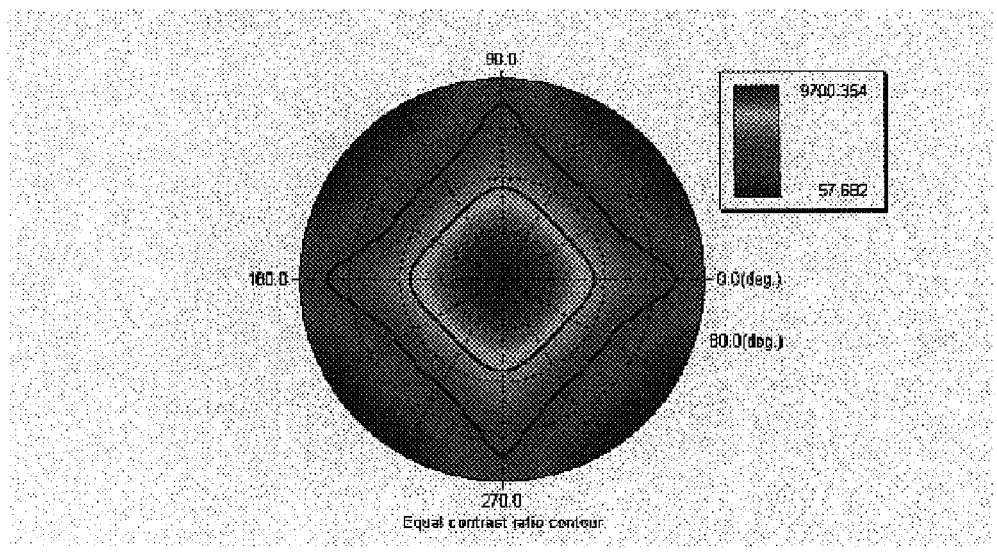
FIG. 16 is an iso-contrast contour for an LCD having the structure of FIG. 15 using conventional A-plate and C-plate.
Figure 17:
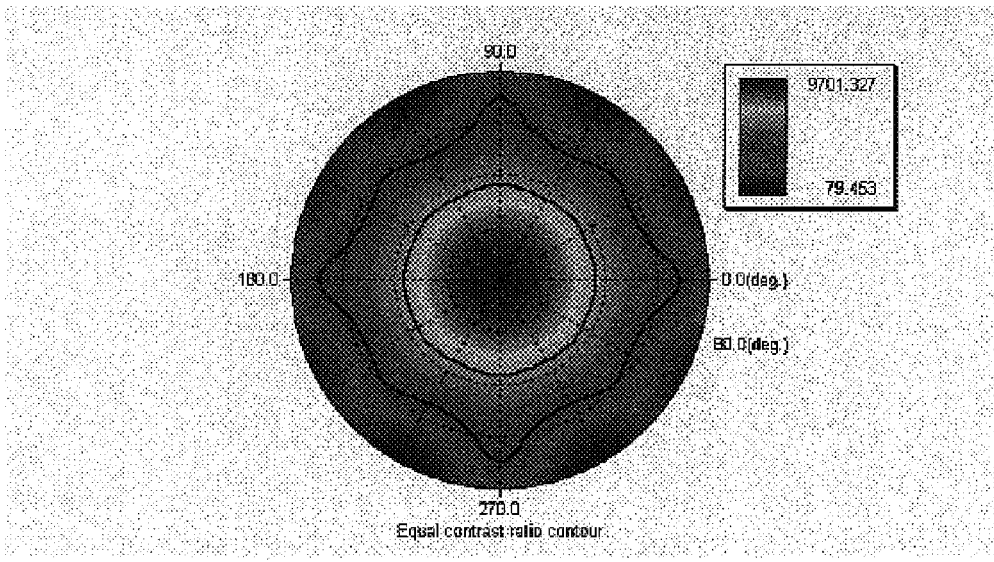
FIG. 17 is an iso-contrast contour for an LCD having the structure of FIG. 15 using optimized A-plate and C-plate of the present disclosure.

FIG. 16 shows an iso-contrast contour for an LCD having the structure of FIG. 15 using the conventional A-plate and C-plate described above. FIG. 17 shows an iso-contrast contour for an LCD having the structure of FIG. 15 using the optimized A-plate and C-plate described above. As shown in FIG. 16 and FIG. 17, it can be seen that the LCD using the conventional A-plate and C-plate has a contrast of only 182, while the LCD using the optimized A-plate and C-plate has a contrast of 449 when viewed at a polar angle $\Theta$ of 60 degrees and at an azimuthal angle $\phi$ of 45 degrees.

When a LCD having the structure of FIG. 15 is optimized for blue light (450 nm), the in-plane retardation of an optimized A-plate at wavelengths of 450 nm and 550 nm satisfies the following formula (13):

$$0.5 < R0(450)/R0(550) < 1.198 \tag{13}$$

Moreover, the retardation of the C-plate satisfies the following formula (14):

$$1.125 < Rth(450)/Rth(550) < 1.583 \tag{14}$$

When a LCD having the structure of FIG. 15 is optimized for red light (650 nm), we have found that the in-plane retardation of an optimized A-plate at wavelengths of 650 nm and 550 nm satisfies the following formula (15):

$$1.03 < R0(650)/R0(550) < 1.468 \tag{15}$$

Moreover, the retardation of the C-plate satisfies the following formula (16):

$$0.72 < Rth(650)/Rth(550) < 0.995 \tag{16}$$

It should be understood that, when an LCD having the structure of FIG. 1 is optimized for both blue light (450 nm) and red light (650 nm), the in-plane retardation of an optimized A-plate at wavelengths of 450 nm, 550 nm and 650 nm should satisfy the formulae (13) and (15), and Rth values for an optimized C-plate at wavelengths of 450 nm, 550 nm and 650 nm should satisfy the formulae (14) and (16).

The optical compensators provided in the present disclosure (A plate/C-plate and biaxial plate) are optimized for lights of three primary colors (450 nm, 550 nm, 650 nm) such that the dark-state light leakage is reduced at most viewing angles which results in a better contrast.

Although the disclosure has been explained in relation to various embodiments, it is to be understood that many other possible modifications and variations can be made without departing from the spirit and scope of the disclosure as hereinafter claimed.

What is claimed is:

1. A liquid crystal display comprising:
   a liquid crystal display cell;
   two polarizers respectively provided on outer surfaces of the liquid crystal display cell; and
   two biaxial plates respectively provided between the two polarizers and the liquid crystal display cell,
   wherein the retardation of at least one of the two biaxial plates satisfies the following formulae (5) and (6):

$$82.38 < R0(450) + 0.41 \times Rth(450) < 107.35 \tag{5}$$

$$-910.5 < R0(450) - 5.5 \times Rth(450) < -690.5 \tag{6}$$

where R0(450) represents the in-plane retardation of the at least one of the two biaxial plates at a wavelength of 450 nm, and Rth(450) is the value calculated by $Rth=[[n_x+n_y]/2-n_z] \times d$ (where $n_x$, $n_y$ and $n_z$ represent the three-dimensional refractive indexes of the at least one of the two biaxial plates as the refractive indexes in the direction of the x-axis, y-axis and z-axis, respectively, and d represents the thickness of the at least one of the two biaxial plates) for the at least one of the two biaxial plates at a wavelengths of 450 nm.

2. The liquid crystal display as claimed in claim 1, wherein the retardation of the at least one of the two biaxial plates at a wavelength of 650 nm satisfies the following formulae (7) and (8):

$$180.872 < R0(650) + 0.975 \times Rth(650) < 206.681 \tag{7}$$

$$-295.241 < R0(650) - 2.51 \times Rth(650) < -206.537 \tag{8}$$

3. A liquid crystal display comprising:
a liquid crystal display cell;
two polarizers respectively provided on outer surfaces of the liquid crystal display cell; and
two biaxial plates respectively provided between the two polarizers and the liquid crystal display cell,
wherein the retardation of at least one of the two biaxial plates satisfies the following formulae (7) and (8):

$$180.872 < R0(650) + 0.975 \times Rth(650) < 206.681 \quad (7)$$

$$-295.241 < R0(650) - 2.51 \times Rth(650) < -206.537 \quad (8)$$

where R0(650) represents the in-plane retardation of the at least one of the two biaxial plates at a wavelength of 650 nm, and Rth(650) is the value calculated by $Rth = [[n_x + n_y]/2 - n_z] \times d$ (where $n_x$, $n_y$ and $n_z$ represent the three-dimensional refractive indexes of the at least one of the two biaxial plates as the refractive indexes in the direction of the x-axis, y-axis and z-axis, respectively, and d represents the thickness of the at least one of the two biaxial plates) for the at least one of the two biaxial plates at a wavelengths of 650 nm.

4. A liquid crystal display comprising:
a liquid crystal display cell;
first and second polarizers respectively provided on outer surfaces of the liquid crystal display cell;
a biaxial plate provided between the first polarizer and the liquid crystal display cell; and
two 80 μm thick triacetate cellulose films respectively provided between the first polarizer and the biaxial plate as well as between the second polarizer and the liquid crystal display cell,
wherein the retardation of the biaxial plate satisfies the following formulae (9) and (10):

$$-1914 < R0(450) - 7.56 \times Rth(450) < -1311.7 \quad (9)$$

$$51.17 < R0(450) + 0.12 \times Rth(450) < 93.07 \quad (10)$$

where R0(450) represents the in-plane retardation of the biaxial plate at a wavelength of 450 nm, and Rth(450) is the value calculated by $Rth = [[n_x + n_y]/2 - n_z] \times d$ (where $n_x$, $n_y$ and $n_z$ represent the three-dimensional refractive indexes of the biaxial plate as the refractive indexes in the direction of the x-axis, y-axis and z-axis, respectively, and d represents the thickness of the biaxial plate) for the biaxial plate at a wavelengths of 450 nm.

5. The liquid crystal display as claimed in claim 4, wherein the retardation of the biaxial plate at wavelengths of 650 nm satisfies the following formulae (11) and (12):

$$157.5 < R0(650) + 0.576 \times Rth(650) < 200.7 \quad (11)$$

$$-143.988 < R0(650) - 1.34 \times Rth(650) < -68.14 \quad (12)$$

where R0(650) represents the in-plane retardation of the biaxial plate at a wavelength of 650 nm, and Rth(650) represents Rth value of the biaxial plate at a wavelengths of 650 nm.

6. A liquid crystal display comprising:
a liquid crystal display cell;
first and second polarizers respectively provided on outer surfaces of the liquid crystal display cell;
a biaxial plate provided between the first polarizer and the liquid crystal display cell; and
two 80 μm thick triacetate cellulose films respectively provided between the first polarizer and the biaxial plate as well as between the second polarizer and the liquid crystal display cell,
wherein the retardation of the biaxial plate satisfies the following formulae (11) and (12):

$$157.5 < R0(650) + 0.576 \times Rth(650) < 200.7 \quad (11)$$

$$-143.988 < R0(650) - 1.34 \times Rth(650) < -68.14 \quad (12)$$

where R0(650) represents the in-plane retardation of the biaxial plate at a wavelength of 650 nm, and Rth(650) is the value calculated by $Rth = [[n_x + n_y]/2 - n_z] \times d$ (where $n_x$, $n_y$ and $n_z$ represent the three-dimensional refractive indexes of the biaxial plate as the refractive indexes in the direction of the x-axis, y-axis and z-axis, respectively, and d represents the thickness of the biaxial plate) for the biaxial plate at a wavelengths of 650 nm.

* * * * *